B. R. VAN KIRK.
SIDE BEARING FOR ELECTRIC TRUCKS.
APPLICATION FILED JUNE 17, 1912.

1,097,488.

Patented May 19, 1914.

Witnesses—

Inventor—
Benjamin R. Van Kirk,
by his Attorneys—

UNITED STATES PATENT OFFICE.

BENJAMIN R. VAN KIRK, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

SIDE BEARING FOR ELECTRIC TRUCKS.

1,097,488.  Specification of Letters Patent.  Patented May 19, 1914.

Application filed June 17, 1912. Serial No. 704,192.

*To all whom it may concern:*

Be it known that I, BENJAMIN R. VAN KIRK, a citizen of the United States, residing in Philadelphia, Pennsylvania, have invented certain Improvements in Side Bearings for Electric Trucks, of which the following is a specification.

My invention relates to certain improvements in means for preventing "nosing" of a car from side to side, when said car is traveling on a straight or on a crooked track.

This invention is an improvement on the application filed by Samuel M. Vauclain on May 4th, 1912, under Serial No. 695,107.

In the above application the weight of the car body was taken solely by the side bearings when the car was passing around a curve or curves.

In some types of cars the body is so built that the entire load cannot be supported by the side frame, and the object of my invention is to distribute the load so that part of the weight is taken by the center bearings and the balance by the side bearings of the truck. This object I attain by mounting the side bearings on yielding supports and providing means for regulating the supports so as to properly distribute the load.

Figure 1:
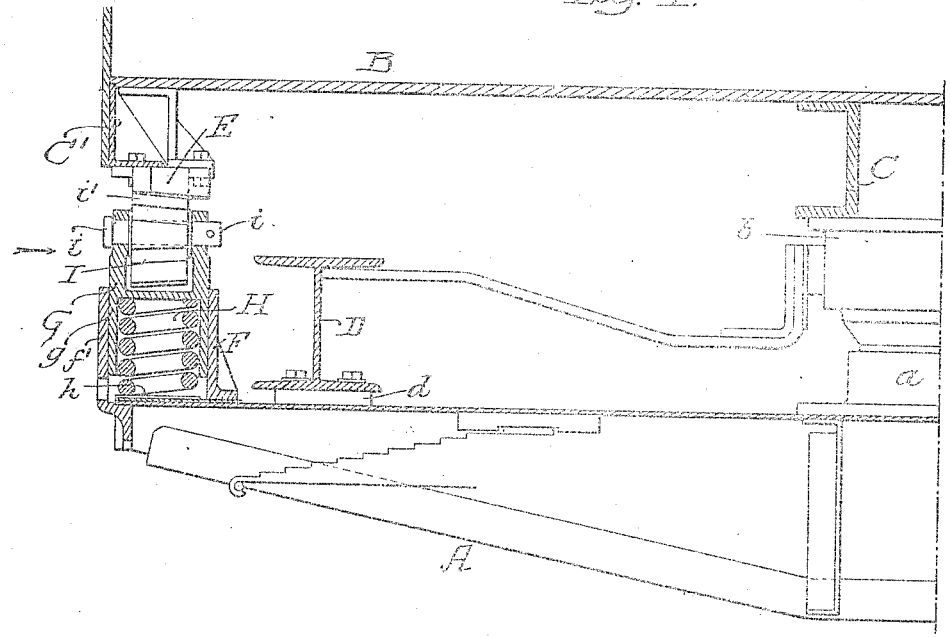
Figure 2:
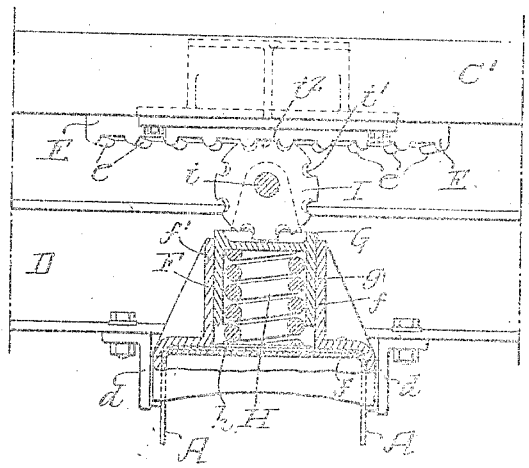

In the accompanying drawing:—Figure 1, is a transverse sectional view illustrating one half of a portion of the truck and the car body; and Fig. 2, is an end view looking in the direction of the arrow, Fig. 1.

Referring to the drawing, A is the body bolster of a truck having a center bearing $a$, of any type desired.

B is the car body having longitudinal central stringers C and side stringers C'.

$b$ is the center pin, which enters the center bearing of the bolster A of the truck. The car body at this point is not provided with a body bolster and the weight is carried by the central stringers and by the side stringers C, C'.

D is a part of the frame of the truck having guides $d$ extending on each side of the bolster A. The balance of the truck has been omitted from the drawing, as it will be understood that any form of truck may be used with my improved means.

Secured to the under side of each stringer C' is a segmental plate E having teeth $e$, and on each end of the truck bolster A is a casing F having a flange $f$ by which it is secured to the bolster A and a cylindrical extension $f'$, into which extends the cylindrical portion $g$ of a bearing G. This cylindrical portion is hollow, in the present instance, and located within the casing is a spiral spring H, either resting directly on the top bolster A or upon liners $h$. The number of these liners may be increased or diminished, according to the amount to which it is desired to compress the spring.

Mounted in the upper portion of the bearing G is a pin $i$ on which is mounted the wheel I having notches $i'$ into which extend the teeth $e$. This wheel is slightly tapered and the surface of the segmental plate E is also slightly tapered; the line of the taper being taken from the intersection of the vertical center line and the line of the pin $i$; the plate E being shaped to conform to the shape of the wheel. The portion $i^2$ of the wheel is flat and the two teeth of the plate E on each side of the center rest in the recesses in the wheel on each side of the flat surface when the longitudinal line of the truck is parallel with the longitudinal line of the car body. This is the normal position of the parts and "nosing" of the truck is prevented by this construction, owing to the fact that the truck, in order to turn, must overcome the weight of the car body.

When the car is passing around a curve, then the wheel I rolls over the surface of the toothed plate E and as it rolls it lifts the car body so that the weight of the car body will come directly on each wheel.

In a car body structure, as above described, where there is no body bolster directly above the truck, which would ordinarily support the load, then the load, if taken entirely by the side bearing wheels, would tend to strain the car body. To overcome this, I locate a spring under each bearing of the wheel I and the tension of this spring is so regulated that a portion of the load is transferred to the center bearing. Consequently, the "nosing" of the truck is prevented; the weight being distributed between the side bearing wheels and the center bearing and the car body will be supported without dangerous strains.

I claim:—

The combination of a car truck having a bolster; a center bearing on the bolster;

two side bearings; casings; one mounted at each end of the bolster; a bearing frame having a hollow portion extending into each casing; a spring located in the casing and extending into the hollow portion; a notched wheel carried by said bearing frame and having a flat portion; a car body having a center bearing and having a toothed segmental plate at each side directly above the side bearings of the truck and engaging the wheels so that part of the load is carried by the center bearing and part by the side bearings.

In testimony whereof, I have signed my name to this specification, in the presence of two subscribing witnesses.

BENJAMIN R. VAN KIRK.

Witnesses:
Jos. H. Klein,
Wm. A. Barr.